(12) United States Patent
Sakakibara et al.

(10) Patent No.: US 6,563,290 B2
(45) Date of Patent: May 13, 2003

(54) BATTERY PACK CHARGING SYSTEM AND BATTERY PACK

(75) Inventors: Kazuyuki Sakakibara, Anjo (JP); Masaaki Fukumoto, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 10/025,419

(22) Filed: Dec. 18, 2001

(65) Prior Publication Data

US 2002/0079867 A1 Jun. 27, 2002

(30) Foreign Application Priority Data

Feb. 21, 2000 (JP) ........................... 2000-388415

(51) Int. Cl.$^7$ .................... H01M 10/44; H01M 10/46
(52) U.S. Cl. .................. 320/106; 320/150; 320/162
(58) Field of Search ................. 320/106, 116, 320/118, 119, 150, 157, 160, 162, 163, 164

(56) References Cited

U.S. PATENT DOCUMENTS

| | | | |
|---|---|---|---|
| 5,371,453 A | 12/1994 | Fernandez | 320/5 |
| 5,691,620 A | 11/1997 | Nagai et al. | 320/15 |
| 5,744,937 A | 4/1998 | Cheon | 320/125 |
| 5,998,966 A | 12/1999 | Gaza | 320/116 |
| 6,040,683 A | 3/2000 | Mottier | 320/137 |
| 6,204,640 B1 | 3/2001 | Sakakibara | 320/150 |

FOREIGN PATENT DOCUMENTS

| | | | |
|---|---|---|---|
| EP | 0621990 | 12/1996 | H02J/7/04 |
| EP | 1039612 | 9/2000 | H02J/7/00 |
| WO | WO 96/21954 | 7/1996 | H01M/10/46 |

OTHER PUBLICATIONS

European Search Report Apr. 2002.

*Primary Examiner*—Edward H. Tso
(74) *Attorney, Agent, or Firm*—Orrick, Herrington & Sutcliffe LLP

(57) ABSTRACT

Charging device 10 charges nickel-hydrogen batteries 58, while adjusting the current value so that the temperature follows the target temperature rise pattern. Therefore, nickel-hydrogen batteries that demonstrate a large temperature increase can be charged within a short time so that a high temperature is not attained. Furthermore, when lithium ion batteries 58 are charged, the current value is controlled so that the voltage follows the target voltage rise pattern. Therefore, lithium ion batteries can be charged at a potential no higher than the preset level.

22 Claims, 11 Drawing Sheets

(A)

(B)

(A)

(B)

BATTERY PACK CHARGING SYSTEM AND BATTERY PACK

BACKGROUND OF THE INVENTION

1. Field of the Invention

The present invention relates to a charging system for charging a battery and to a battery pack. More specifically, the present invention relates to a charging system for charging a first battery which can be charged at a constant current, such as a nickel-hydrogen battery, and a second battery which cannot be charged at a constant current and can be charged only at a potential below the preset level, such as a lithium ion battery, with the same charging device, and to a battery pack in which the second battery which cannot be charged at a constant current is charged by using a charging device for charging the first battery which can be charged at a constant current, such as a nickel-hydrogen battery.

2. Discussion of the Prior Art

Nickel-hydrogen batteries are presently used as high-performance batteries. Nickel-hydrogen batteries may have a capacity higher than that of nickel-cadmium batteries that have found wide application, but they generate a large amount of heat in charging, and when a high temperature is reached because of such heat generation, the electrodes or separators of the battery inner cell are degraded, shortening the service life and, therefore, making the batteries difficult to handle.

Lithium ion batteries have started finding application as the batteries demonstrating higher performance than the nickel-hydrogen batteries. When a potential above the preset level was applied to the lithium ion batteries, there was even a danger of inflammation and the batteries were very difficult to handle. For this reason, it was necessary to charge the lithium ion batteries at a constant current at the initial stage of charging and to conduct charging at a constant voltage having the prescribed value when the battery voltage reached the preset value so as not to exceed the preset value of the potential.

The inventors have studied the possibility of charging lithium ion batteries with a charging device for charging nickel-hydrogen batteries at a constant current. However, it was predicted that since a potential exceeding the preset value cannot be applied to lithium ion batteries, as was mentioned above, and the lithium ion batteries have to be charged at a constant voltage, a constant-voltage charging circuit has to be added to make the charging possible which will increase the cost.

SUMMARY OF THE INVENTION

With the foregoing in view, it is an object of the present invention to provide a charging system which is capable of charging a first battery which can be charged at a constant current, such as a nickel-hydrogen battery, and a second battery which can be charged only at a potential no higher than the preset level, such as a lithium ion battery, with one charging device comprising no constant-voltage charging circuit.

Another object of the present invention is to provide a battery pack suitable for charging a second battery that cannot be charged at a constant current by using a charging device designed for charging a first battery which can be charged at a constant current, such as a nickel-hydrogen battery.

According to the present invention, a charging system for charging a first battery which can be charged at a constant current and a second battery which can be charged only at a potential below the preset level with the same charging device, wherein said first battery comprises a temperature detecting element, said second battery comprises an output unit for outputting a potential corresponding to the battery voltage, and said charging device comprises a detection unit for detecting the temperature of the first battery and the voltage of the second battery, a current value search unit for searching a current value at which the temperature of the first battery that was detected with said detection unit follows the target temperature rise pattern during charging and searching a current at which the voltage of the second battery follows the target voltage rise pattern during charging, and a charging current control unit for charging the batteries at the current value found by said current value search unit.

In the charging system in accordance with the more preferred teaching of the present invention, when the charging device charges the first battery which can be charged at a constant current, such as a nickel-hydrogen battery, charging of the battery is conducted, while the current value is being adjusted so that the temperature follows the target temperature increase pattern. As a result, charging can be conducted within a short time so that the nickel-hydrogen battery demonstrating an intensive increase in temperature is not heated to a high temperature. Moreover, when the same charging device is used for charging the second battery which can be charged only at a potential no higher than the preset level, such as a lithium ion battery, charging is conducted, while the electric current is being adjusted so that the voltage follows the target voltage increase pattern. As a result, the lithium ion battery can be charged at a potential no higher than the preset level. Therefore, the first battery which can be charged at a constant current, such as a nickel-hydrogen battery, and a second battery which can be charged only at a potential no higher than the preset level, such as a lithium ion battery, can be charged with one charging device provided with no constant-voltage charging circuit.

In accordance with the more preferred teaching of the present invention, a detection unit detects the temperature of the first battery based on the potential of a resistor connected to a temperature detecting element incorporated in the first battery. As a result, the detection unit can accurately detect the temperature of the first battery based on the potential of the resistor and also the battery voltage of the second battery based on the potential corresponding to the battery voltage from the output unit of the second battery.

In accordance with the more preferred teaching of the present invention, the first battery stores the temperature rise pattern during charging which is the target for the first battery, and the second battery stores the voltage rise pattern during charging which is the target for the second battery. As a result, various first batteries and various second batteries can be charged according to the respective battery characteristics.

According to the present invention, a battery pack in which the second battery which can be charged only at a potential no higher than the preset level is charged with a charging device conducting charging so that the temperature of the first battery follows the target temperature rise pattern during charging by detecting the temperature of the first battery which can be charged at a constant current by the potential and controlling the charging current so that changes in the potential follow the preset pattern, wherein by outputting the potential corresponding to the voltage of the second battery to said charging device, said charging device is caused to control the charging current so that the changes in the potential follow the preset pattern and to conduct charging so that the voltage of the second battery follows the target voltage rise pattern during charging.

According to the present invention, the battery pack outputs a potential corresponding to the second battery voltage to the charging device. Because of such output, in the charging device, the charging current is controlled so as to obtain the preset pattern of changes in the potential and charging is conducted so that the voltage of the second battery follows the target voltage rise pattern during charging. As a result, the second battery which cannot be charged at a constant current can be charged by using a charging device that can charge the first battery which can be charged at a constant current, such as a nickel-hydrogen battery.

PREFERRED EMBODIMENT OF THE INVENTION

The charging device of the preferred embodiment of the present invention will be described below with reference to the drawings.

Figure 2:
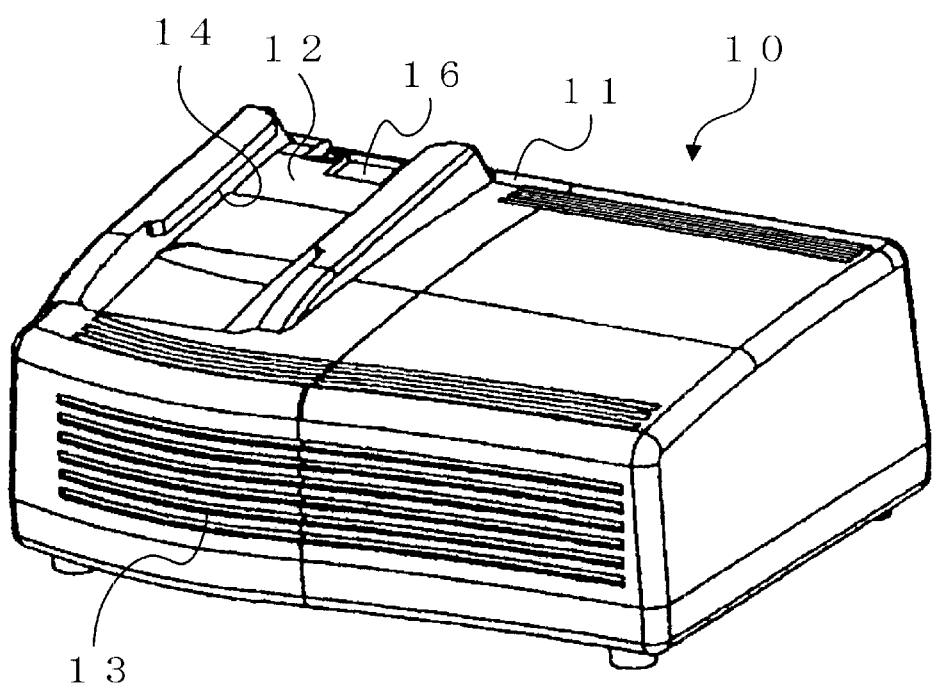
FIG. 2 is a perspective view illustrating the appearance of the charging device of the first embodiment of the present invention.
Figure 3:
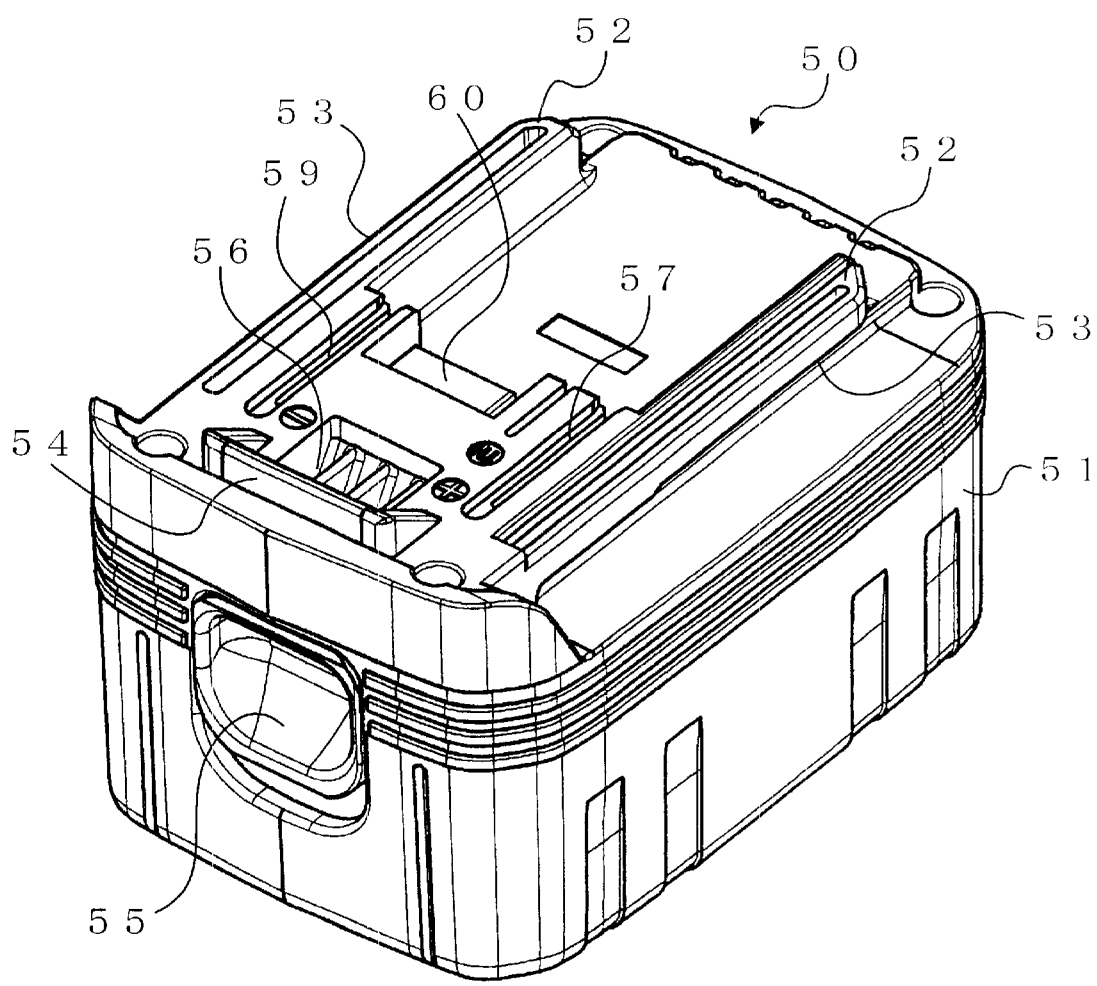
FIG. 3 is a perspective view illustrating the appearance of the battery pack.
Figure 4:
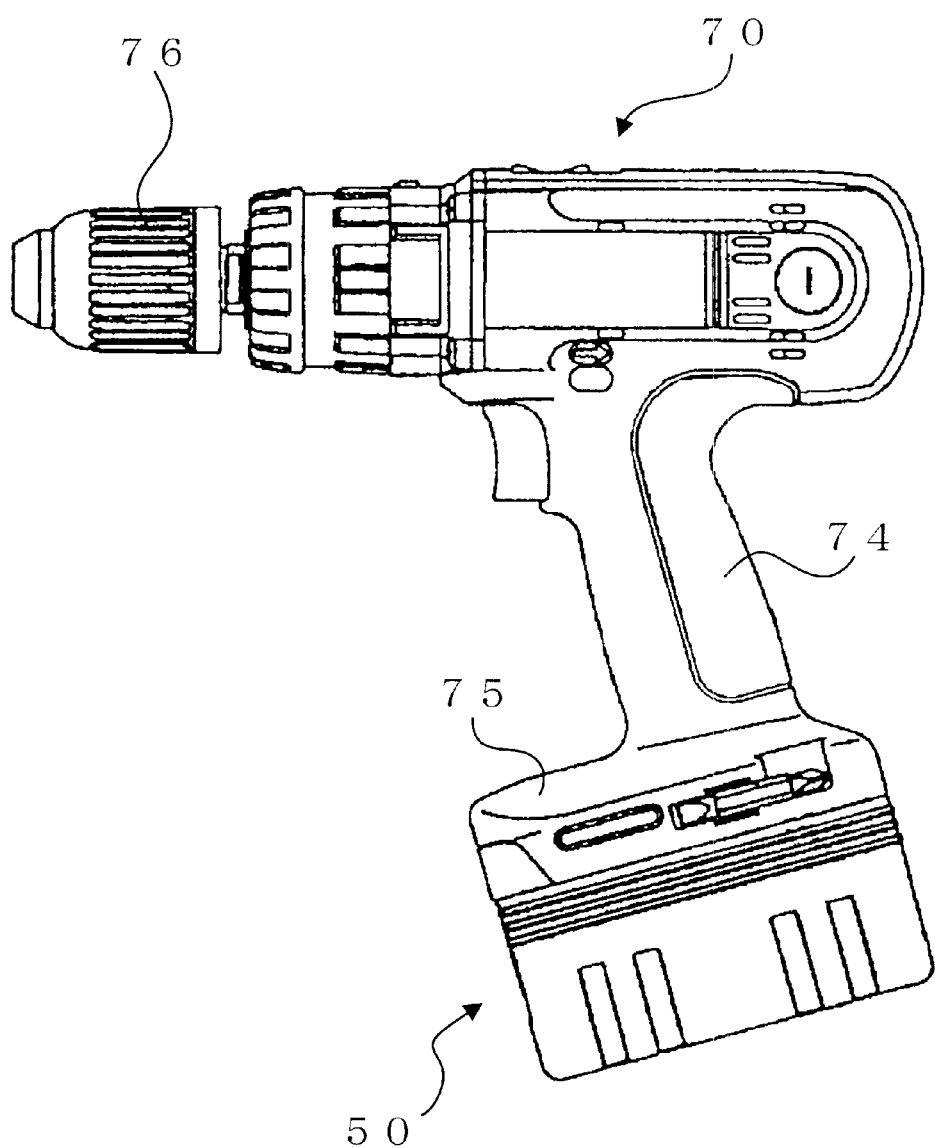
FIG. 4 is a side view of a battery-powered drill using the battery pack shown in FIG. 3.

A charging device 10 is designed to charge a battery pack 50 incorporating nickel-hydrogen batteries 58, as shown in FIG. 1(A). In the first preferred embodiment, a battery pack 50B incorporating lithium ion batteries 58B, as shown in FIG. 1(B) comprises a battery voltage transformation circuit 62, which makes it possible to conduct charging with charging device 10 designed for charging the nickel-hydrogen batteries. FIG. 2 shows the appearance of charging device 10. FIG. 3 shows the appearance of battery pack 50. FIG. 4 shows a battery-powered drill 70 driven by battery pack 50.

The structure of battery pack 50 which is charged with charging device 10 will be explained with reference to FIG. 3.

In battery pack 50, a plurality of nickel-hydrogen batteries 58 electrically connected in series to each other are incorporated, as shown in FIG. 1(A), into casing 51 made of a resin and molded to have an almost rectangular shape. The battery pack comprises a temperature sensor TM for detecting the temperature of batteries 58 and an EEPROM 61 storing data such as battery pack system and the like. The temperature sensor TM comprises a thermistor whose electric resistance changes depending on the temperature.

As shown in FIG. 3, fitting portions 52 forming fitting grooves 53 are formed parallel each other in a rail-like configuration on the upper end side of casing 51 of battery pack 50. They can be engaged with battery-powered drill 70 or charging device 10 when the battery pack is installed thereon. Further, a hook 54 that can be inserted or removed in the vertical direction is provided in a zone located at one end of fitting portions 52. Hook 54 is integrally molded with a lever 55 provided at the side surface of casing 51 and is impelled in the protrusion direction by a coil spring (not shown in the figures). As a result, when battery pack 50 is installed on battery-powered drill 70 or charging device 10, the hook can be engaged with the prescribed hook groove formed therein.

Therefore, the hook serves to prevent easy separation of battery pack 50 from battery-powered drill 70 or charging device 10. Furthermore, when lever 55 is pushed down toward the lower end of casing 55 against the impelling force of coil spring, hook 54 is moved toward the lower end so as to be retracted. Therefore, the engagement with the hook groove is released and battery pack 50 can be separated from battery-powered drill 70 or charging device 10.

Furthermore, a vent opening 56, a plus terminal groove 57, a minus terminal groove 59, and a connector 60 are provided on the upper end side of casing 51 so as to be located between the fitting portions 52. Vent opening 56 is formed in a position in which it can be linked to a ventilation opening 16 provided in charging device when battery pack 50 is installed on charging device 10. As a result, air can be passed through the battery pack 50 by a cooling fan incorporated in charging device 10, thereby making it possible to cool the battery pack 50 during charging. In other words, charging device 10 provides an air cooling system.

On the other hand, a plus terminal T1 and a minus terminal T2 shown in FIG. 1(A) are provided in plus terminal groove 57 and minus terminal groove 59, respectively. The configuration of those terminals t1 and T2 is such that they can be brought in contact with charging terminals or output terminals of the mating apparatus when battery pack 50 is installed on battery-powered drill 70 or charging device 10. Terminals T4, T5 for connecting the temperature sensor TM shown in FIG. 1(A) and terminal T6 for connecting EEPROM 61 are provided inside a connector 60.

The battery pack 50 having the above-described configuration is used by installing it on battery-powered drill 70, shown in FIG. 4. A battery pack attachment 75 is formed in battery-powered drill 70 below a grip 74 that can be held by a user. A fitting portion that can be engaged with fitting portion 52 of battery pack 50 and the prescribed hoot groove that can be engaged with hook 54 of battery pack 50 are formed in battery pack attachment 75. Therefore, battery pack 50 can be detachably attached to battery pack attachment 75.

In battery-powered drill 70 having battery pack 50 thus installed thereon, the plus terminal T1 and minus terminal T2 of battery pack 50 are connected to charging terminals (not shown in the figures) at the side of battery-powered drill 70 to receive power supply. As a result, a chuck 76 can be rotated by a motor (not shown in the figures). The appearance of lithium ion battery pack 50B is identical to that of nickel-hydrogen battery pack 50 described above with reference to FIG. 3 and the description thereof is omitted.

The structure of charging device 10 for charging the battery pack 50 and battery pack 50B will be described below with reference to FIG. 1(A) and FIG. 2.

As shown in FIG. 2, charging device 10 has a resin casing 11. A fitting portion 12 on which the battery pack 50 can be installed or an air suction opening 13 through which the air supplied into battery pack 50 by the incorporated cooling fan can be sucked in from the outside is formed integrally with casing 11. Furthermore, various indicators (not shown in the figures), such as a capacity indication lamp for indicating the capacity of battery pack 50 during charging or a state indication lamp for indicating an operation state of charging device 10, are provided at casing 11 of charging device 10 and actuated and controlled by the below-described control circuit.

A guide 14 which can guide the fitting groove 53 of battery pack 50 and a ventilation opening 16 that can be linked to vent opening 56 of battery pack 50 are formed in fitting portion 12, and the prescribed hook groove that can be engaged with hook of battery pack 50 is provided in the ventilation opening 16. Furthermore, output terminals t1, t2 that can be electrically connected to plus terminal T1 and minus terminal T2 of battery pack 50 are also provided in fitting portion 12, and a connector (not shown in the figures) that can be connected to connector 60 of battery pack 50 is also provided therein. The connector contains output terminal t3, t4 for power supply, a terminal t5 for connection to the temperature sensor TM of battery pack 50, and a communication terminal t6 for connection to EEPROM 61 of battery pack 50.

As shown in FIG. 1(A), a control circuit of charging device 10 is mainly composed of a first power source circuit 22A for charging the battery pack, a charge current control unit 24 for controlling the charge current, a control unit 26 that can constitute a detection unit for detecting the battery temperature (and voltage in the below-described case) and a current search unit for searching the charge current value, a voltage detection unit 27 comprising a pair of resistors, a resistor R1 for temperature detection, a memory unit 29, and a second power supply circuit 22B for supplying a constant voltage of 5 V.

First power supply circuit 22A is set so as to have a capacity sufficient to charge batteries 58 of battery pack 50. First power supply circuit 22A and second power supply circuit 22B receive power supply from a transformer which steps down the voltage of a commercial power source (not shown in the figures), and first power supply circuit 22A adjusts the charging current to the batteries by changing the duty ratio. On the other hand, second power supply circuit 22B is designed to supply a constant voltage of 5 V, and 5 V potential can be output via the output terminals t3, t4. Output terminal t4 is connected to ground of second power supply circuit 22B.

As shown in FIG. 1(A), resistor R1 for temperature detection is connected in series with the temperature sensor TM whose resistance varies depending on the temperature, and a voltage of 5 V is supplied from the second power supply circuit 22B. Control unit 26 detects the battery temperature during charging from changes in the potential between resistor R1 for temperature detection and temperature sensor TM and also detects the voltage supplied to the battery from the changes in potential on the resistor of voltage detection unit 27 comprising a pair of resistors. On the other hand, memory unit 29 stores the current value control data such as the prescribed map.

EEPROM 61 of nickel-hydrogen battery pack 50 stores the battery type (nickel-hydrogen battery) and the below-described target temperature rise pattern during charging. When the nickel-hydrogen battery pack 50 is charged, control unit 26 can determine the temperature rise value by differentiating the temperature values calculated based on the potential of resistor R1 for temperature detection, then calculate the prescribed current value based on the temperature rise pattern, and output this current value as a current command value to charging current control unit 24. Charging current control unit 24 controls the first power source circuit 22A based on the current command value from control unit 26 and adjusts the charging current of battery pack 50.

Figure 1:
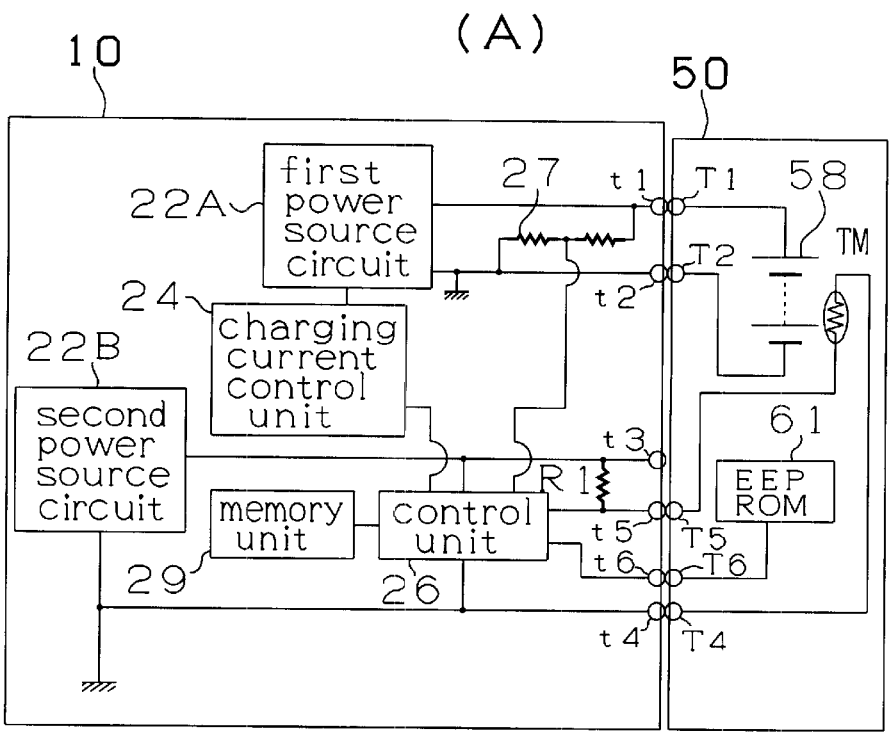
FIG. 1(A) is a block diagram illustrating a control circuit of the charging device of the first embodiment of he present invention and a nickel-hydrogen battery pack.
FIG. 1(B) is a block diagram illustrating a control circuit of the charging device and a lithium ion battery pack.
Figure 1:
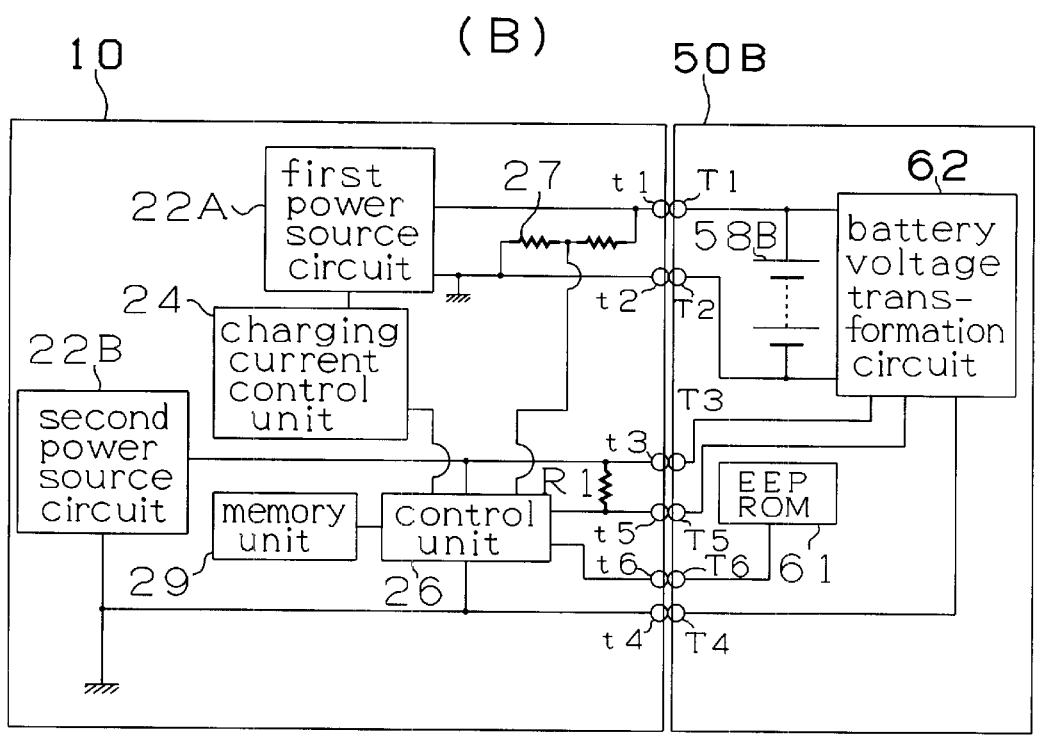
Figure 5:
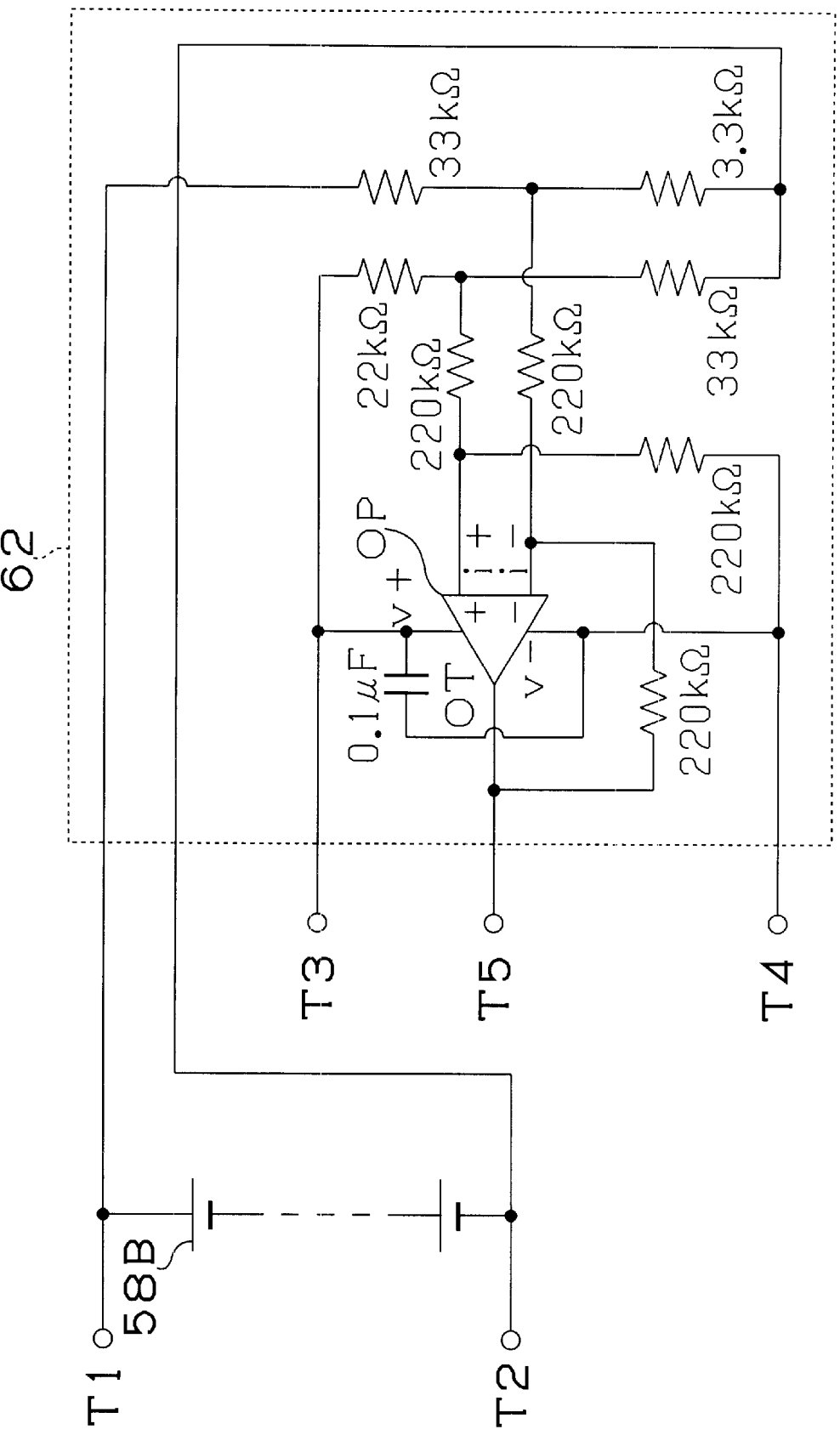
FIG. 5 is a circuit diagram of a battery voltage transformation circuit incorporated in the lithium ion battery pack.

As shown in FIG. 1(B), lithium ion battery pack 50(B) comprises lithium ion batteries 58B, EEPROM 61, and a battery voltage transformation circuit 62 that can constitute an output unit detecting and outputting the potential of lithium ion batteries 58B. Battery voltage transformation circuit 62, as shown by a circuit diagram in FIG. 5, is connected to terminals T1, T2 connected to the first power source circuit 22A shown in FIG. 1 and lithium ion batteries 58B and also to terminal T3 to which a potential of 5 V is applied from the second power source circuit 22B, terminal T5 connected to control unit 26, and terminal T4 connected to ground of second power source circuit 22B.

Voltage of the plus terminals of lithium ion batteries 58 and a potential of 5 V (terminal T3) from the second power source circuit 22B are applied to the non-inverter input i+ of operational amplifier OP of the battery voltage transformation circuit, while being divided between a 22 KΩ resistor and a 33 KΩ resistor. Furthermore, a potential of lithium ion batteries 58 is applied to the inverted input i−, while being divided between a 33 KΩ resistor and 3.3 KΩ resistor. Furthermore, a potential of 5 V (terminal T3) from the second power source circuit 22B is applied to a positive power source v+ of operational amplifier OP, and the ground potential (terminal T4) from the second power source circuit 22B is applied to the negative power source v−. The operational amplifier OP applies a voltage corresponding to the potential of lithium ion batteries 58B from the output terminal OT to control unit 26 of charging device 10 via terminal T5. In the present embodiment, a configuration was used in which a constant voltage of 5V was supplied from the charging device. However, a constant voltage source may also be provided in the lithium ion battery pack 50B.

The configuration of control unit 26 is such that when lithium ion batteries 58B are charged, it can determine the voltage rise value by differentiating the voltage values calculated based on the potential supplied from the battery voltage transformation circuit, then calculate the prescribed current value based on the below-described voltage rise pattern, and output the current value to charging current control unit 24 as a current command value. Then, charging current control unit 24 controls the first power source circuit 22A based on the current command value from control unit 26 and adjusts the charging current of battery pack 50B.

If a nickel hydrogen battery pack 50 or lithium ion battery pack 50B is installed on the fitting portion 12 of charging device 10 having the above-described configuration, control unit 26 controls the first power source circuit 22A and charging current control unit 24 according to the prescribed algorithm and charges nickel-hydrogen batteries 58 in battery pack 50 or lithium ion batteries 58B in lithium ion battery pack 50B. If the capacity indication lamp indicating the capacity of battery pack 50 comes on during charging and charging is completed, the charging is terminated and the user is informed about it by the same lamp. The structure of control unit 26 is such that it can conduct a variety of operations such as charging.

The operation principle of the charging device of the first preferred embodiment will be described below.

A. Control of Charging Current According to Temperature Rise Pattern (Charging of the First Battery (Nickel-Hydrogen Battery, Nickel-Cadmium Battery, and the Like) Which Can be Charged by Applying Any Voltage)

If the charging current in batteries such as nickel-hydrogen batteries, nickel-cadmium batteries and the like is increased, the charging time is shortened, but the temperature increase becomes significant. Conversely, if the charging current is decreased, the charging time is extended, but the temperature rise is reduced. A specific feature of nickel-hydrogen batteries is that the temperature gradient (temperature rise value) changes significantly depending on the charge current and the already charged capacity. For this reason, in the present embodiment, charging is conducted, while changing the current value in order to suppress the temperature rise. Thus, in the conventional charging devices, charging has been conducted at a constant current value, whereas in the charging device of the present embodiment, the state of batteries is determined based on the temperature rise value and charging is conducted by changing the current value according to the temperature rise in the battery, that is, the current that can flow, while the temperature rise in the battery is made constant.

Figure 6:
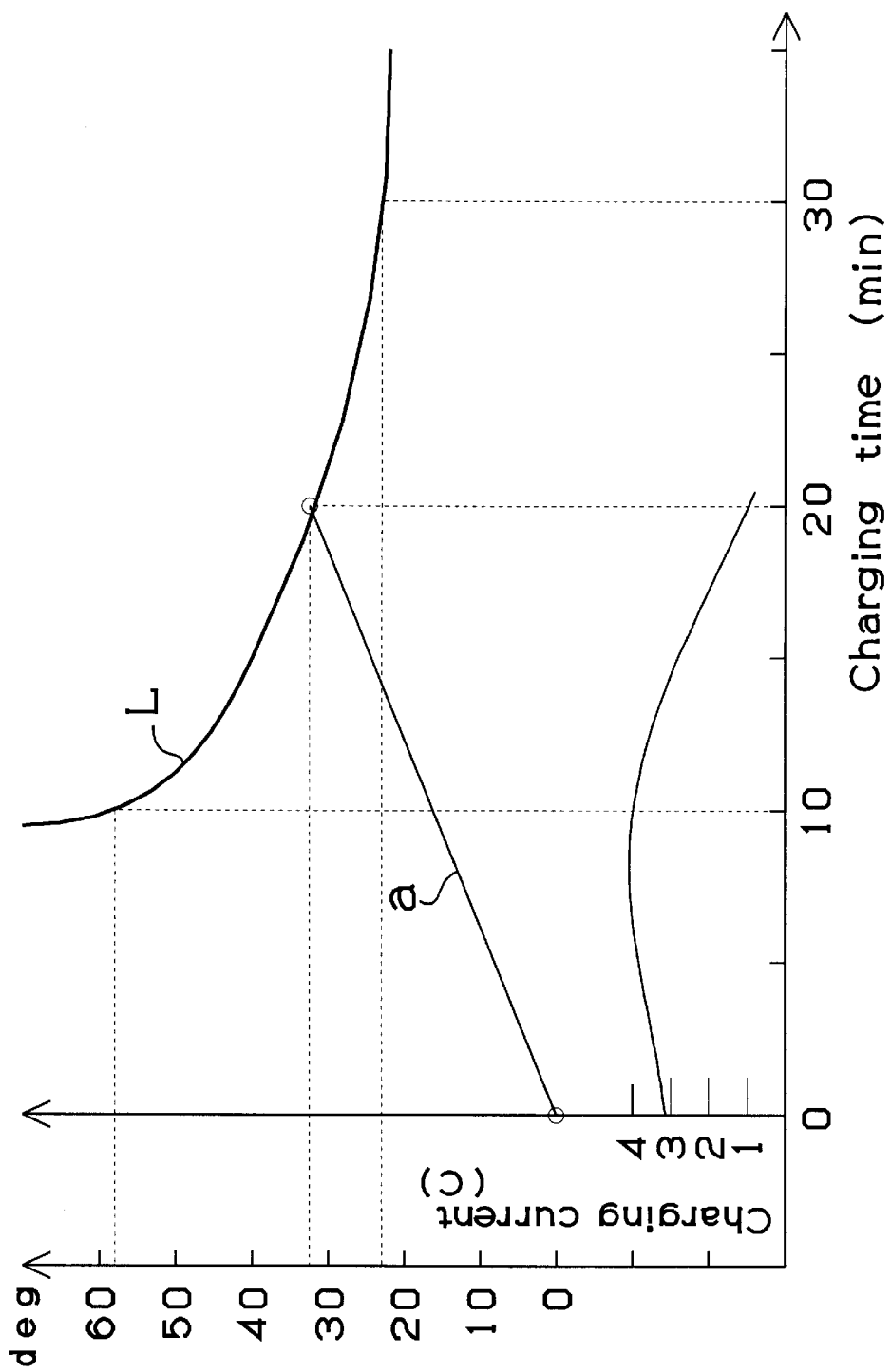
FIG. 6 is a graph illustrating the charging principle of the charging system of the first embodiment.

The charging principle of the first embodiment will be described below with reference to FIG. 6. In FIG. 6, a battery temperature rise value is plotted against the ordinate and the charging time is plotted against the abscissa. Curve L in the figure represents the temperature rise values at charging completion corresponding to the charging time, those values being observed when charging was conducted so that the temperature rise value was constant. For example, when the electric current was controlled so that the battery temperature that initially was 20° C. reached 53° C. (temperature rise value of 33 deg), the charging time was 20 min, when the electric current was controlled so that the battery temperature reached 43° C. (temperature rise value of 23 deg), the charging time was 30 min, and when the electric current was controlled so that the battery temperature reached 78° C. (temperature rise value of 58 deg) the charging time was 10 min.

Thus, the temperature rise value (gradient) can be determined from the charging completion time and battery temperature rise value at the time of charging completion based on curve L. For example, it is clear that in order to complete charging in 20 min, charging may be conducted so as to obtain a temperature gradient (temperature rise value) shown by line (a) connecting 0 deg in the figure and 33 deg on curve L. In this case, charging is completed almost exactly in 20 min when the temperature becomes 53° C. (temperature rise value 33 deg).

FIG. 6 also shows changes in the current value corresponding to a constant temperature rise value which are shown as the charging current. In order to obtain a constant temperature rise value, the value of charging current should be frequently adjusted. However, for the sake of convenient illustration, fine adjustment components are omitted. As shown in the figure, the current value in the first half of charging is relatively large, gradually decreasing in the second half of charging. Here, a rapid decrease in charging current at the completion of charging indicates that charging of the nickel-hydrogen batteries was completed. In the present embodiment, charging is completed when this effect is detected.

Furthermore, the so-called "overshoot" effect is sometimes observed in the nickel-hydrogen batteries. Thus, at the completion of charging, the temperature may rapidly increase because of the past charging history rather that owing to the present charging current. In case of such overshoot, the temperature rise value cannot be made below the preset value even if the current value is decreased. In the present embodiment, charging is completed when this effect is detected.

A case in which the current value is adjusted so as to obtain a constant temperature rise value will be described below with reference to FIG. 6. In the first embodiment, the current value is adjusted so that the temperature rises according to the prescribed pattern in order to further shorten the charging time.

Figure 7:
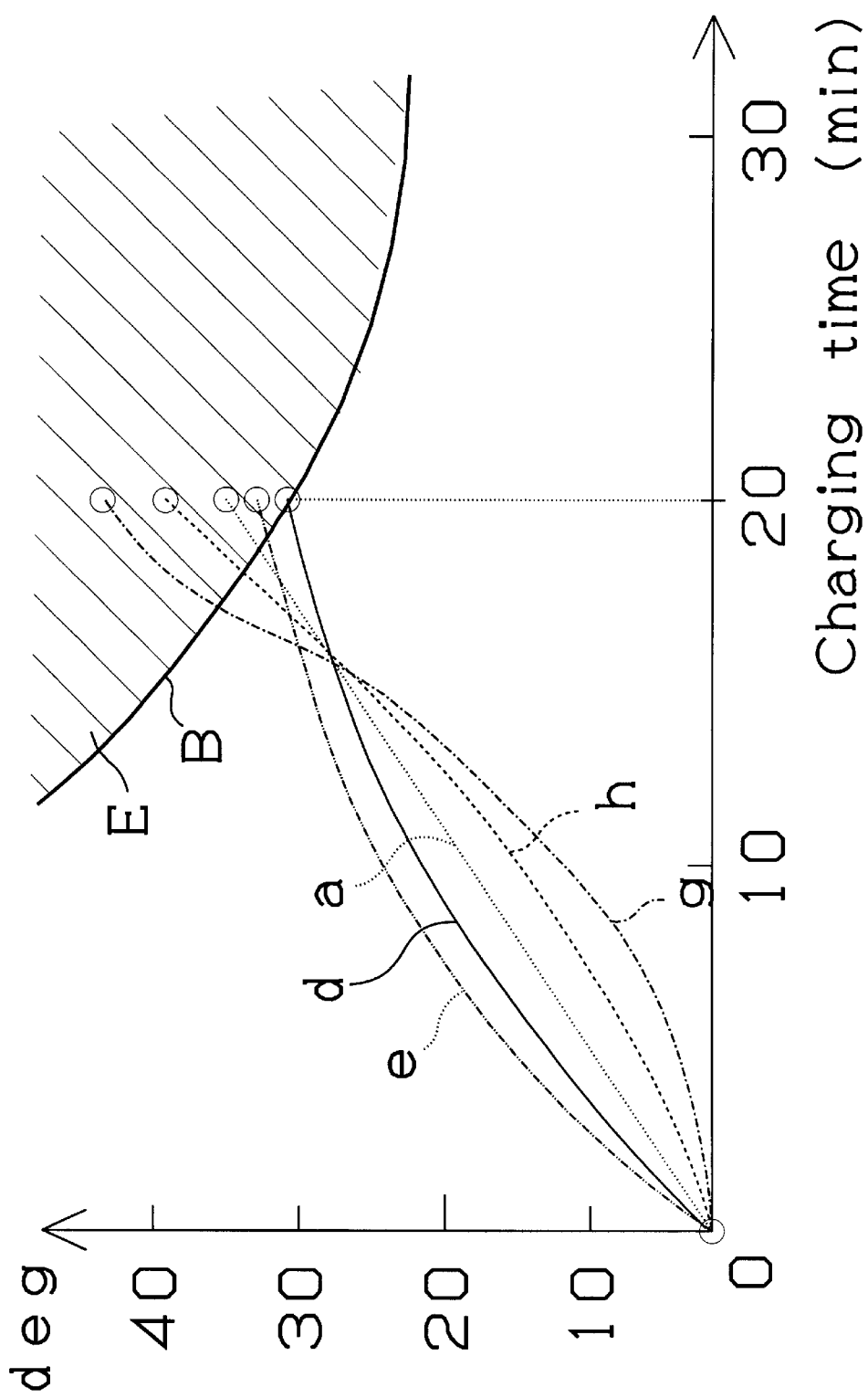
FIG. 7 is a graph illustrating changes in the battery temperature and charging current controlled by the charging device.

The prescribed pattern will be described below with reference to FIG. 7. In FIG. 7, a battery temperature rise value is plotted against the ordinate and the charging time is plotted against the abscissa. The area E shown by hatching represents the charging time and temperature rise value at the charging completion time. For example, when the temperature gradient shown by (a) in the figure was made constant so that the charging conducted with the charging device of the first embodiment was completed within 20 min, the temperature at charging completion was 33 deg. On the other hand, when charging was conducted so that the temperature rise value changed following a peak-like pattern shown by solid line (d) in the figure, the charging could be completed at a battery temperature rise value of 30° C. Furthermore, when charging was conducted so that the temperature rise value changed following a peak-like pattern shown by a dash-two-dot line (e) that was more convex than the solid line (d), the charging could be completed at a battery temperature rise value of 32 deg. Conversely, when charging was conducted according to a valley-like pattern shown by a broken line (h), the charging was completed at a battery temperature rise value of 38° C. On the other hand, when charging was conducted so that the temperature rise value did not match a specific pattern, the battery temperature rise value increased to about 43 deg.

Thus, area E shown by hatching represents the charging time and temperature rise value at charging completion obtained under various charging conditions. The boundary line B of area E represents the temperature rise value attained when charging was completed at the lowest temperature. On the other hand, broken line (a) shown in FIG. 7 demonstrates that when the temperature rise value was made constant, as was explained with reference to FIG. 6, the battery temperature rise value was 33 deg. By contrast, it is clear that charging can be completed at the lowest temperature rise value (30 deg) by following a peak-like temperature rise pattern shown by solid line (d) in the figure. The reason why charging can be completed at the low temperature when the temperature rise value is controlled as peak-like rather than the temperature rise value is made constant lies as follows. The temperature rise pattern is set so that the difference of temperature between battery temperature and atmosphere temperature is small, battery is hardly cooled, capacity is nearly empty, temperature rise in charging is relatively small, temperature rise value in the first half period of charging is relatively high, contrary, the difference of temperature between battery temperature and atmosphere temperature is large, battery is easily cooled, temperature rise in charging is relatively large, temperature rise value in the remaining half period of charging is relatively low. That is, charging can be conducted so that the temperature at the time of charging completion is the lowest by optimizing the temperature rise pattern. In the present embodiment, based on the result of the above experiment, the current value is adjusted and charged based on the temperature rise pattern so that the charging can be competed at the lowest temperature.

In the charging system of the present embodiment, EEPROMs of a plurality of nickel-hydrogen battery packs 50 store respective data for determining the temperature rise patterns described above with reference to FIG. 7. Thus, the temperature rise pattern differs significantly depending on the voltage of battery pack (number of cells), battery type (even some of nickel-hydrogen batteries can have different characteristics), heat emission ability of battery pack, and the like. Therefore, storing respective temperature rise patterns for a plurality of battery packs makes it possible to charge any battery pack with highest efficiency.

B. Control of Charging Current According to Voltage Rise Pattern
(Charging of Battery (Lithium Ion Battery) Requiring Constant-Voltage Charging in the Final Period of Charging)

Figure 8:
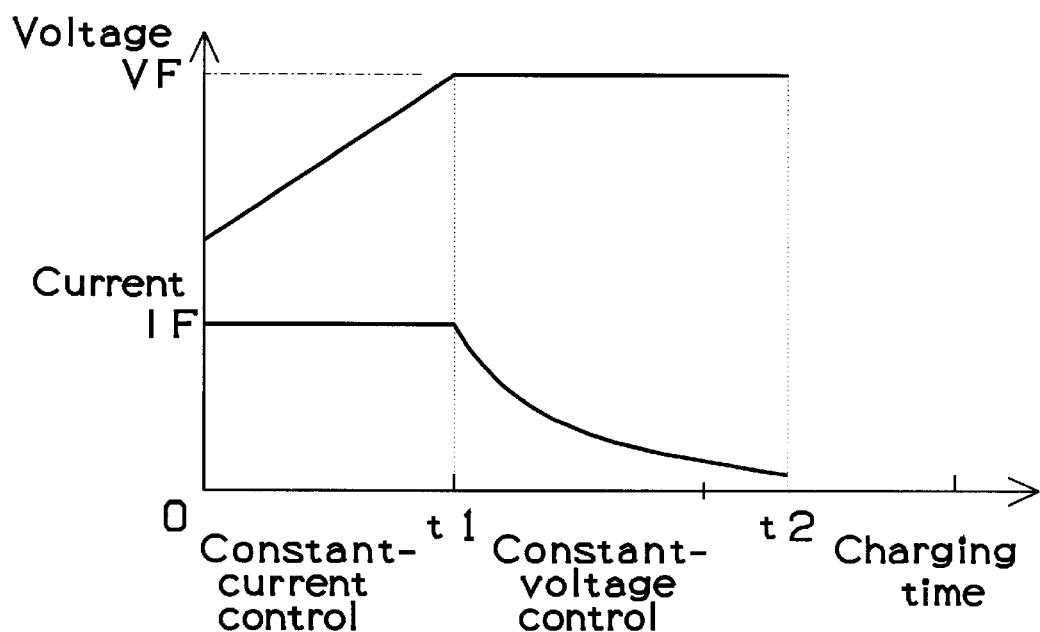
FIG. 8(A) illustrates the conventional method for charging of lithium ion batteries.
FIG. 8(B) illustrates the method for charging of lithium ion batteries of the present embodiment.
Figure 8:
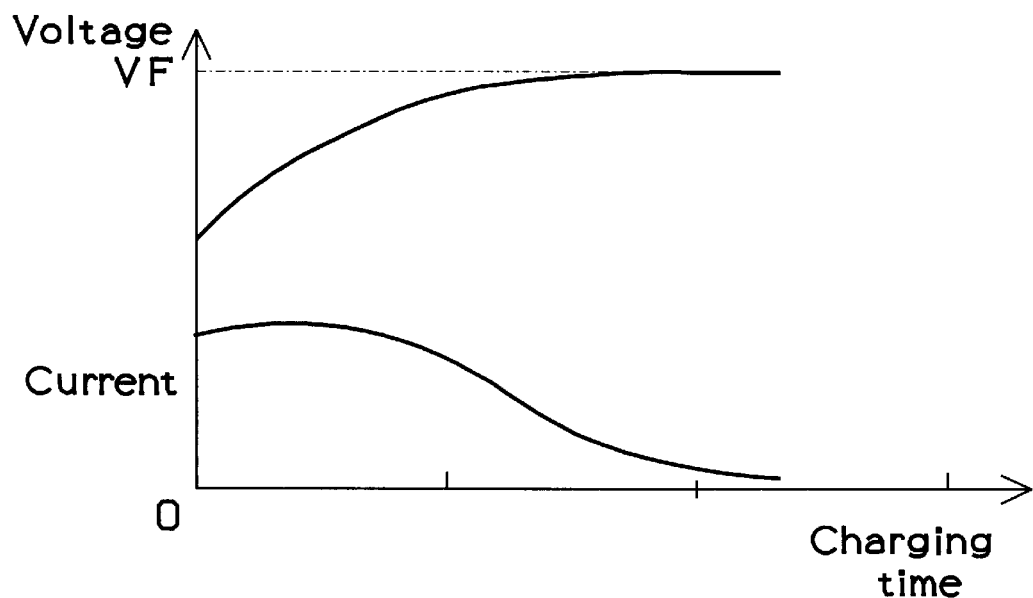

FIG. 8(A) illustrates the conventional method for charging of lithium ion batteries. If a voltage above the preset value VF is applied to a lithium ion battery, it can even cause inflammation of the battery. For this reason, charging is started at a constant current (constant current control) and when the voltage of the lithium ion battery increases and reaches the preset value VF (time t1), the constant-current control is switched to a constant-voltage control so as to retain the preset value VF and charging is continued till the current becomes no more than a preset value (time t2). Thus, in the conventional charging system, charging of lithium ion batteries required a constant-current control and a constant-voltage control.

FIG. 8(B) illustrates the lithium ion battery charging system of the present embodiment. In the present embodiment, the current value is controlled so as to obtain a voltage rise pattern shown in the figure. With such control, the charging device 10 charges the lithium ion battery pack 50 by switching the charging current, without using a constant-voltage circuit.

Charging device 10 is a commercial product designed to conduct charging so that the temperature of nickel-hydrogen battery pack 50 is raised according to the temperature rise pattern described above with reference to FIG. 7. In the first embodiment, charging of lithium ion batteries can be conducted without any modification of the charging device. Therefore, a battery voltage transformation circuit 62 is installed on the lithium ion battery pack 50B and charging is conducted by applying a voltage value corresponding to the voltage of the lithium ion battery 58B from the lithium ion battery pack 50B to the charging device. Thus, charging device 10 inputs temperature changes in the nickel-hydrogen battery pack 50 as a voltage value and controls the current so as to follow the temperature rise pattern. When such charging device charges the lithium ion battery pack 50B, it inputs voltage changes of the lithium ion battery (recognized as temperature changes by the charging device) as voltage values and controls the current so as to follow the voltage rise pattern (recognized as the temperature rise pattern by the charging device), thereby charging the lithium ion batteries in the same manner as nickel-hydrogen batteries.

Figure 9:
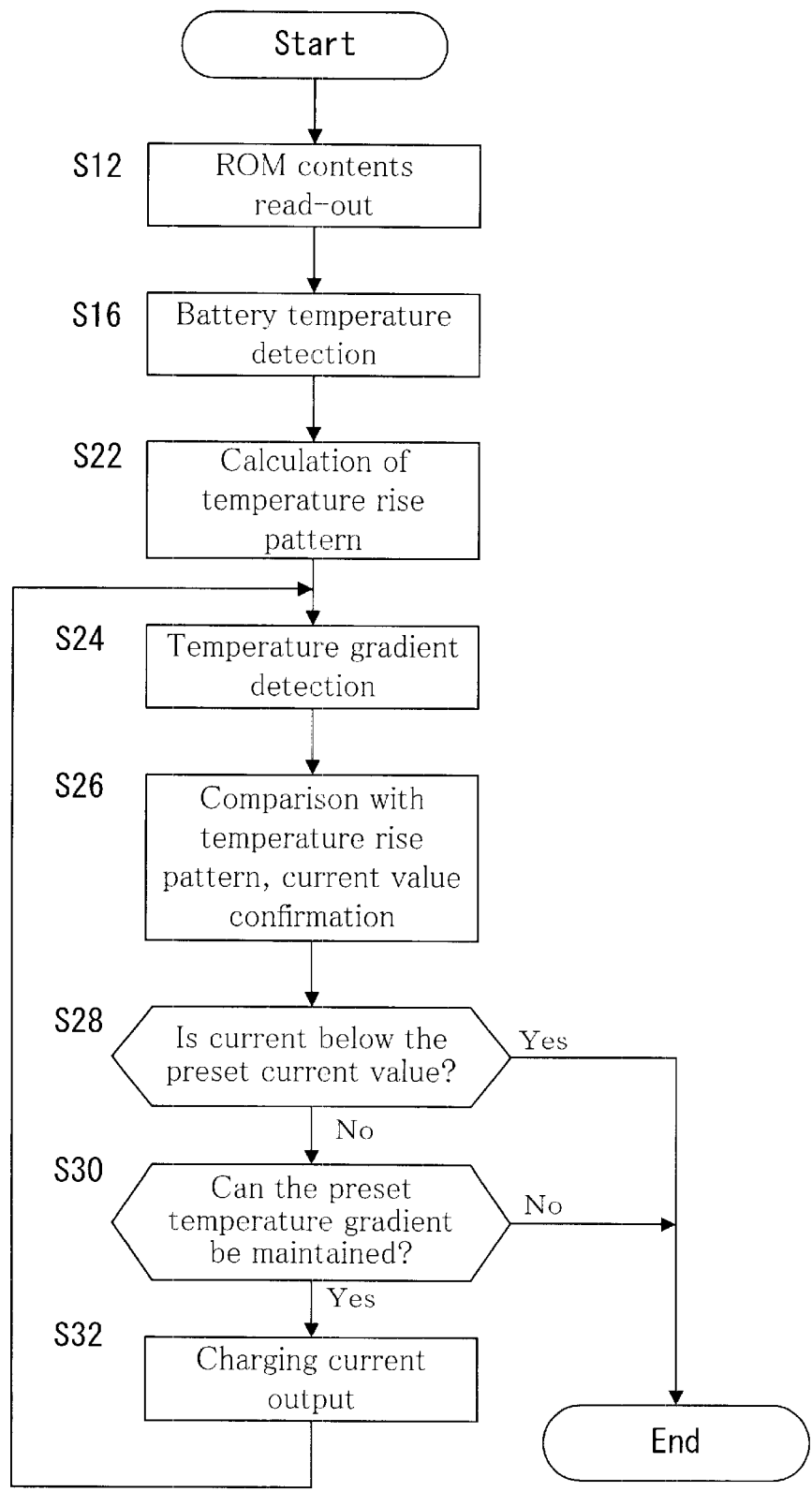
FIG. 9 a flow chart illustrating the processing conducted by the control unit of the charging device of the first embodiment.

Specific charging control conducted by the charging device of the first embodiment will be described below with reference to FIG. 9.

[Case when Nickel-Hydrogen Battery Pack 50 is Charged by the Charging Device]

First, control unit 26 of charging device reads the contents of EEPROM 61 of nickel-hydrogen battery pack 50 (S12). Control unit 26 detects the temperature of battery pack 50 based on the voltage value determined by the voltage dividing resistance of thermistor TM and resistor R1 (S16). Then, the peak-like temperature rise pattern described above with reference to FIG. 7 is calculated based on data read from EEPROM 61 of nickel-hydrogen battery pack 50 (S22).

Control unit 26 detects a temperature gradient from the temperature rise pattern (S24), determines the temperature rise value by differentiating the difference between the previously detected temperature value and the temperature value that was input this time, and checks the current value by comparing the detected temperature rise value and the temperature rise pattern calculated in step 22 (S26). When the temperature rise value is less than the gradient, the current value is increased above the present value. Conversely, when the gradient is less, the current value is decreased.

Then, a determination is made as to whether the current value is higher than the preset value or not (S28). If charging is completed and the current value is not higher than the preset value (S28: Yes), the charging processing is completed. On the other hand, when the current is no less than the preset value (S28: No), a determination is made as to whether the preset temperature gradient can be maintained by adjusting the current value or not, that is, whether the overshoot has occurred or not (S30). When the overshoot has occurred (S30: Yes), processing is terminated. On the other hand, when the overshoot has not occurred (S30: No), the program proceeds to step 32, the battery is charged at the current value confirmed in step 26, and charging processing is continued.

In the charging device of this embodiment, the batteries are charged, while the current value is being adjusted so that the temperature rise value follows the temperature rise pattern. Therefore, charging can be conducted so that the temperature at the time of charging completion is the lowest temperature by optimizing the temperature rise pattern as described above with reference to FIG. 7.

[Case when Lithium Ion Battery Pack 50B is Charged by the Charging Device]

First, control unit 26 of charging device reads the content of EEPROM 61 of lithium ion battery pack 50B (S12). Control unit 26 detects the potential (recognized as the temperature by the control unit) based on the output voltage value from the battery voltage transformation circuit 62 incorporated in lithium ion battery pack 50B (S16). Then, a peak-like voltage rise pattern (produced as a temperature rise pattern in the control unit) described above with reference to FIG. 8(B) is calculated based on the data read out from EEPROM 61 of lithium ion battery pack 50B (S22)

Control unit 26 detects the temperature gradient (voltage gradient) from the temperature rise pattern (voltage rise pattern) (S24), determines the temperature rise value (voltage rise value) by differentiating the difference between the previously detected temperature value (voltage value) and the temperature value (voltage value) that was input this time, and checks the current value by comparing the detected temperature rise value (voltage rise value) and the temperature rise pattern (voltage rise pattern) calculated in step 22 (S26). When the temperature rise value (voltage rise value) is less than the gradient, the current value is increased above the present value. Conversely, when the gradient is less, the current value is decreased.

Then, a determination is made as to whether the current value is higher than the preset value or not (S28). If charging is completed and the current value is not higher than the preset value (S28: Yes), the charging is completed. On the other hand, when the current is higher than the preset value (S28: No), a determination is made as to whether the preset temperature gradient (voltage gradient) can be maintained by adjusting the current value or not, that is, whether the overshoot has occurred or not (S30). Here, since no overshoot has occurred in the lithium ion batteries (S30: No), the program proceeds to step 32, the batteries are charged at the current value confirmed in step 26, and charging processing is continued.

In the first embodiment, lithium ion batteries which require constant-voltage charging in the final period of charging can be charged with the existing charging device for nickel-hydrogen batteries and nickel-cadmium batteries, without any modification of the charging device.

The charging system of the second embodiment will be described below. The mechanical structure of the charging device and battery pack of the second embodiment are identical to those of the above-described first embodiment. However, in the first embodiment, charging of a battery pack was conducted without recognizing whether it contains nickel-hydrogen batteries or lithium ion batteries. By contrast, in the second embodiment, the charging device is programmed so as to conduct charging upon recognizing whether the batteries which are to be charged are nickel-hydrogen batteries or lithium ion batteries. Thus, correction of the program of the existing charging device makes it possible to conduct optimum charging of not only the nickel-hydrogen batteries, but also of lithium ion batteries.

Figure 10:
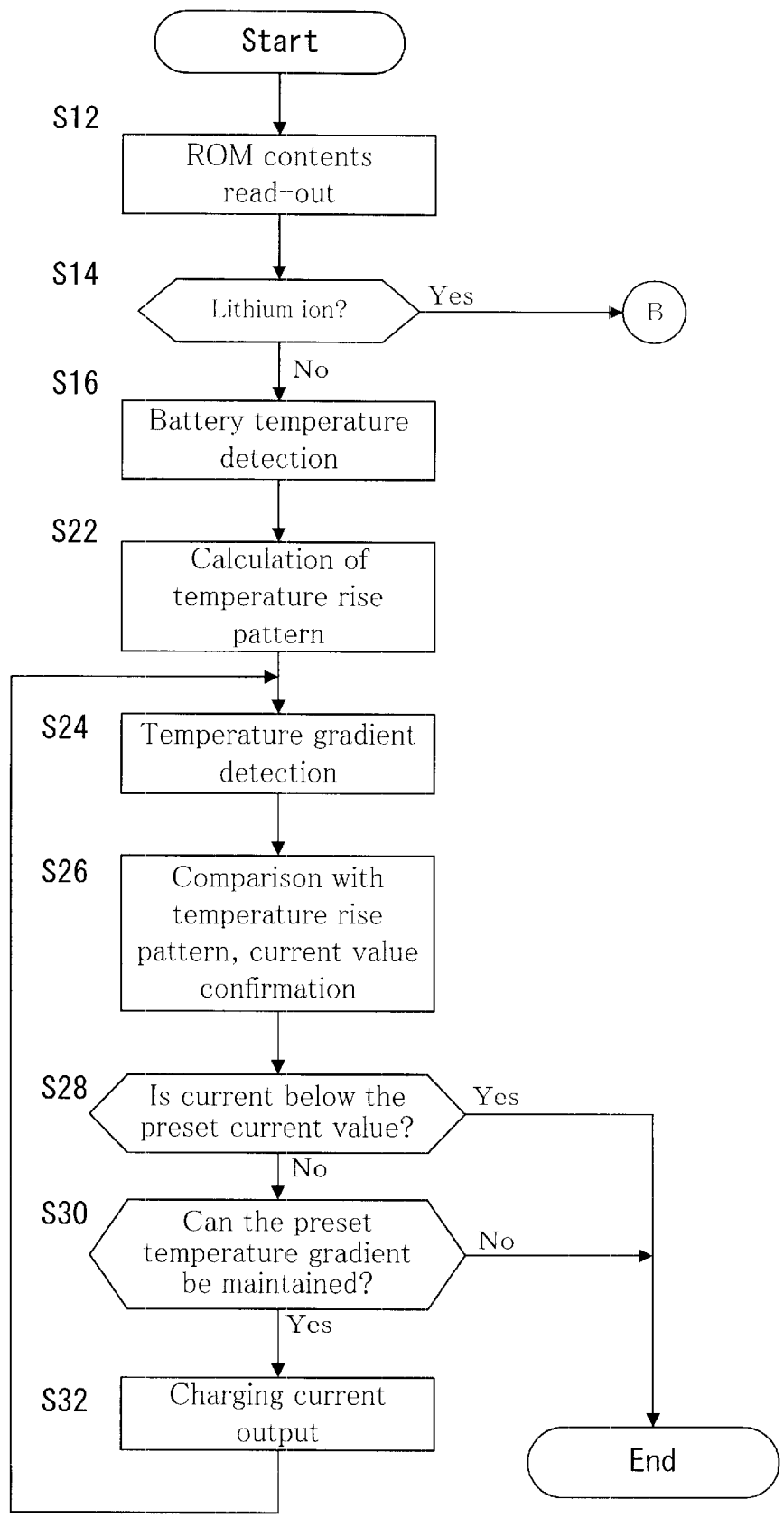
FIG. 10 is a flow chart illustrating the charging processing of nickel-hydrogen batteries conducted by the control unit of charging device of the second embodiment.

Specific charging control in the charging device of the second embodiment will be described below with reference to FIG. 10.

[Case when Nickel-Hydrogen Battery Pack 50 is Charged by the Charging Device]

First, the charging device reads the contents of EEPROM 61 of battery pack 50 (S12). Then, the read-out content is used to determine whether the batteries which are to be charged are in a nickel-hydrogen battery pack 50 or in a lithium ion battery pack 50B (S14). In case of lithium ion batteries (S14: Yes), the program proceeds to the below described charging of lithium ion batteries. On the other hand, in case of nickel-hydrogen batteries (S14: No), control unit 26 detects the temperature of battery pack 50 based on the voltage value determined by the voltage dividing resistance of thermistor TM and resistor R1 (S16). Then, the peak-like temperature rise pattern described above with reference to FIG. 7 is calculated based on data read from EEPROM 61 of nickel-hydrogen battery pack 50 (S22).

Control unit 26 detects the temperature gradient from the temperature rise pattern (S24), determines the temperature rise value by differentiating the difference between the previously detected temperature value and the temperature value that was input this time, and checks the current value by comparing the detected temperature rise value and the temperature rise pattern calculated in step 22 (S26). When the temperature rise value is less than the gradient, the current value is increased above the present value. Conversely, when the gradient is less, the current value is decreased.

Then, a determination is made as to whether the current value is higher than the preset value or not (S28). If charging is completed and the current value is not higher than the preset value (S28: Yes), the charging processing is completed. On the other hand, when the current is higher than the preset value (S28: No), a determination is made as to whether the preset temperature gradient can be maintained by adjusting the current value or not, that is, whether the overshoot has occurred or not (S30). When the overshoot has occurred (S30: Yes), processing is terminated. On the other hand, when the overshoot has not occurred (S30: No), the program proceeds to step 32, the battery is charged at the current value confirmed in step 26, and charging processing is continued.

In the charging device of this embodiment, the batteries are charged, while the current value is being adjusted so that the temperature rise value follows the temperature rise pattern. Therefore, charging can be conducted so that the temperature at the time of charging completion is the lowest temperature by optimizing the temperature rise pattern as described above with reference to FIG. 7.

[Case When Lithium Ion Battery Pack 50B is Charged with Charging Device]

Figure 11:
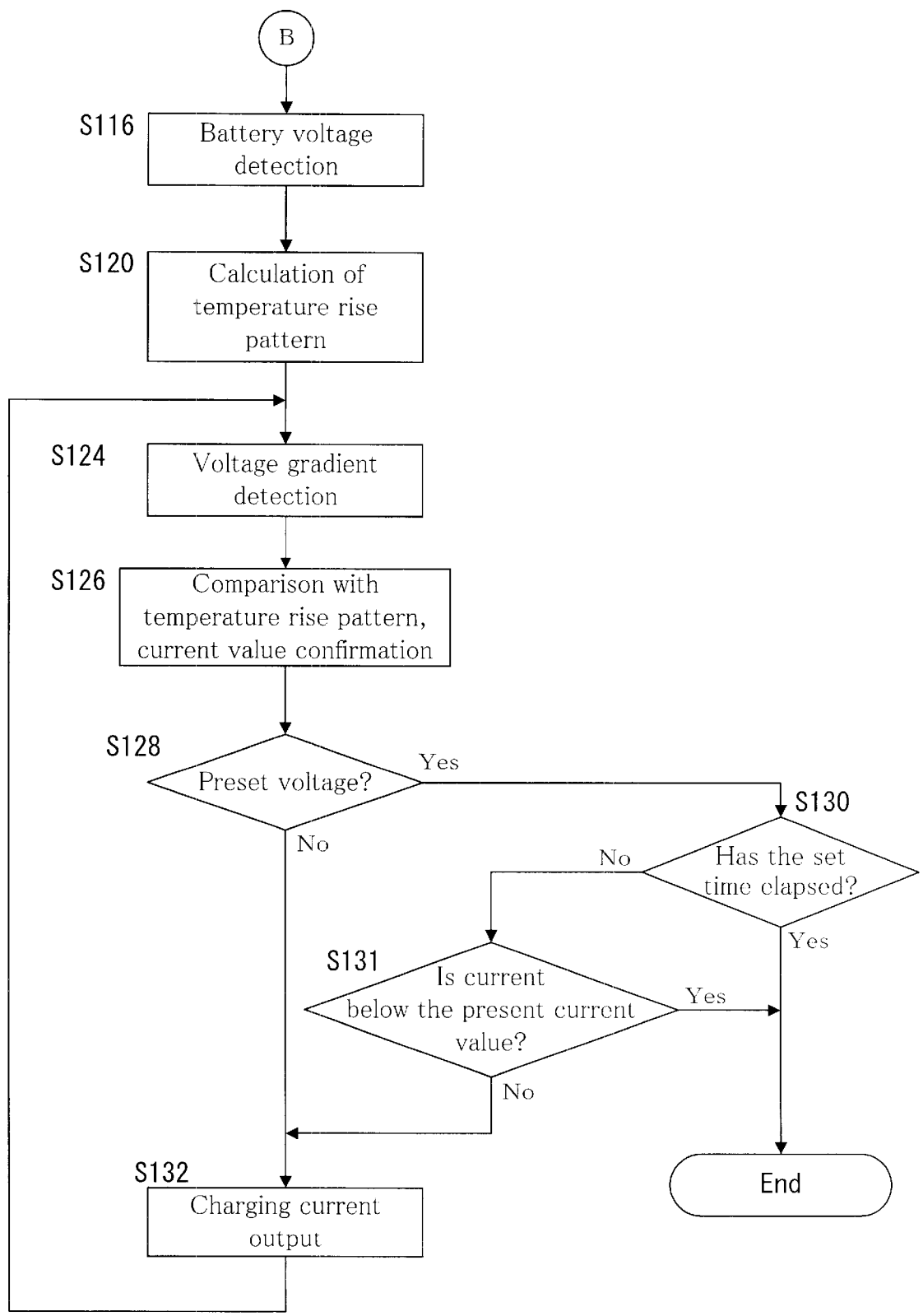
FIG. 11 is a flow chart illustrating the charging processing of lithium ion batteries conducted by the control unit of charging device of the second embodiment.

Control of charging of lithium ion battery pack 50B by the charging device of the second embodiment will be described below with reference to FIG. 11.

First, the charging device reads out the contents of EEPROM 61 of battery pack 50 as described above with reference to FIG. 10 (S12). Then, if the battery which is being charged is determined to be a lithium ion battery based on the read-out contents (S14: Yes), the program proceeds to S116 shown in FIG. 11.

Control unit 26 detects the potential of battery pack 50 based on the output voltage value from the battery voltage transformation circuit 62 incorporated in the lithium ion battery pack 50B (S116). Control 26 determines the voltage gradient from the voltage rise pattern read out from battery pack 50B (S124), then the voltage rise value is determined by differentiating the difference between the previous detected voltage value and the presently input value, and the current value is checked by comparing the detected voltage rise value and the voltage rise pattern calculated in step 120 (S126). Here, when the voltage rise value is less than the voltage rise gradient, the current value is increased above the present value. Conversely, the gradient is lower, the current value is decreased.

Then, a determination is made as to whether the predetermined voltage value (preset value) VF is reached or not (S128). Charging is conducted so that the potential rises following the voltage rise pattern shown in FIG. 8(B) before the present voltage is reached. On the other hand, if the preset voltage VF is reached, charging is conducted, while decreasing the current, so as to maintain the preset voltage (S132). Here, if the preset voltage is reached (S128: Yes), a determination is made as to whether the set time (for example, 10 min) has elapsed since the preset voltage was reached (S130), and charging is completed if the set time has elapsed (S130: Yes) On the other hand, before the set time is reached (S130: No), a determination is made as to whether the charging current value required to maintain the voltage value (preset voltage) VF is less than the preset value or not (S1231). If it is less than the preset value (S131: Yes), charging is completed even before the set time elapses.

In the charging system of the first and second embodiments, when charging device 10 charges nickel-hydrogen batteries, charging is conducted by adjusting the current value so that the temperature follows the target temperature rise pattern. Therefore, nickel-hydrogen batteries demonstrating a large increase in temperature can be charged within a short time so that a high temperature is not attained. Furthermore, when charging device 10 charges the lithium ion batteries 58B, charging is conducted by adjusting the current value so that the voltage follows the target voltage rise pattern. Thus, if the voltage of lithium ion battery pack 50B reaches the preset voltage VF, charging is continued, while reducing the electric current according to the voltage rise pattern shown in FIG. 8(B) so as to maintain the preset voltage VF. Therefore, lithium ion battery pack 50B can be charged safely without applying a voltage exceeding the preset voltage VF. As a result, the first batteries which can be charged at a constant current, such as nickel-hydrogen batteries, and second batteries which can be charged only at a potential below the preset level, such as lithium ion batteries, can be charged with a the same charging device containing no constant-voltage charging circuit.

In the above-described embodiments, an example was considered in which the charging device charged the nickel-hydrogen batteries as the batteries which can be charged at a constant current. However, it goes without saying that other batteries such nickel-cadmium batteries can be charged together with the nickel-hydrogen batteries or instead of them. Furthermore, lithium ion batteries were considered as the batteries which require constant-voltage charging in the final period of charging. However, various lithium batteries can be charged in the charging system of the first and second embodiments.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. A charging system for charging a first battery which can be charged at a constant current and a second battery which can be charged only at a potential below the preset level with the same charging device, wherein said first battery comprises a temperature detecting element, said second battery comprises an output unit for outputting a potential corresponding to the battery voltage, and said charging device comprises:
    a detection unit for detecting the temperature of the first battery and the voltage of the second battery;
    a current value search unit for searching a current value at which the temperature of the first battery that is detected with said detection unit follows the target temperature rise pattern during charging and searching a current at which the voltage of the second battery follows the target voltage rise pattern during charging; and
    a charging current control unit for charging the batteries at the current value found by said current value search unit.

2. The charging system as described in claim 1, wherein said detection unit detects the temperature of the first battery based on the potential of a resistor connected to said temperature detecting element.

3. The charging system as described in claim 1, wherein said first battery stores the temperature rise pattern during charging which is the target pattern for the first battery and said second battery stores the voltage rise pattern during charging which is the target pattern for the second battery.

4. The charging system as described in claim 2, wherein said first battery stores the temperature rise pattern during charging which is the target pattern for the first battery and said second battery stores the voltage rise pattern during charging which is the target pattern for the second battery.

5. The charging system as described in claim 1, wherein said second battery is a lithium ion battery.

6. The charging system as described in claim 2, wherein said second battery is a lithium ion battery.

7. The charging system as described in claim 3, wherein said second battery is a lithium ion battery.

8. A battery charger for charging a first battery which can be charged at a constant current and a second battery which should be charged at a potential below a predetermined level, comprising:
    a detection unit that can detect the temperature of the first battery and the voltage of the second battery;
    means for determining a current value, the current value being either the amount of current applied to the first battery which causes the first battery to follow a target temperature rise pattern or the amount of current applied to the second battery which causes the voltage of the second battery to follow a target voltage rise pattern; and
    a current source that charges the first battery and the second battery at the current value determined by said means for determining.

9. The charging system as described in claim 8, wherein said detection unit detects the temperature of the first battery based on the potential of a resistor connected to said temperature detecting element.

10. The charging system as described in claim 9, wherein said first battery stores said target temperature rise pattern and said second battery stores said voltage rise pattern.

11. The charging system as described in claim 8, wherein said first battery stores said target temperature rise pattern and said second battery stores said target voltage rise pattern.

12. The charging system as described in claim 8, wherein the second battery is a lithium ion battery.

13. The charging system as described in claim 9, wherein said second battery is a lithium ion battery.

14. The charging system as described in claim 10, wherein said second battery is a lithium ion battery.

15. A battery pack that can be charged in a charging device adapted to charge both a first battery type and a second battery type, wherein the first battery type can be charged so that the temperature of the first battery type follows a target temperature rise pattern and the second battery type can be charged at a potential no higher than a preset potential level, the battery pack containing battery cells of the second battery type, comprising:
    means for outputting a potential corresponding to the voltage of the battery cells to said charging device;
    means for receiving charging current such that said potential of said battery cells follow a target voltage rise pattern.

16. The battery pack of claim 15 wherein said means for outputting a potential comprises a battery voltage transformation circuit.

17. A battery charger for charging a battery, the battery comprising a first battery type or a second battery type, the first battery type capable of being charged by applying any voltage, the second battery type capable of being charged by applying a substantially constant voltage falling below a predetermined level, comprising:

a control unit that determines if the battery in the charger is of the first battery type or the second battery type, and if the battery is of the first battery type, detecting the temperature of the battery and setting a current value such that the amount of current applied to the battery causes the battery to follow a target temperature rise pattern, and if the battery is of the second battery type, detecting the voltage of the second battery and setting the current value such that the amount of current applied to the second battery causes the voltage of the second battery to follow a target voltage rise pattern; and a current source that charges the battery at the current value determined by said control unit.

18. The charging system as described in claim 17, wherein the second battery type is a lithium ion battery.

19. A method for charging a first battery that can be charged at a constant current and a second battery which should be charged at a potential below a predetermined level, comprising:

detecting the temperature of the first battery or the voltage of the second battery;

determining a current value, the current value being either the amount of current applied to the first battery which causes the first battery to follow a target temperature rise pattern or the amount of current applied to the second battery which causes the voltage of the second battery to follow a target voltage rise pattern; and supplying current that charges the first battery or the second battery at the current value.

20. The method of claim 19, wherein the second battery is a lithium ion battery.

21. A method for charging a battery, the battery comprising a first battery type or a second battery type, the first battery type capable of being charged by applying any voltage, the second battery type capable of being charged by applying a substantially constant voltage falling below a predetermined level, comprising:

determining if the battery is of the first battery type or the second battery type;

if the battery is of the first battery type:
      detecting the temperature of the battery; and
      setting a current value such that the amount of current applied to the battery causes the battery to follow a target temperature rise pattern;

if the battery is of the second battery type:
      detecting the voltage of the second battery; and
      setting the current value such that the amount of current applied to the second battery causes the voltage of the second battery to follow a target voltage rise pattern; and supplying the current value determined by said control unit to the battery.

22. The method of claim 21, wherein said second battery type is a lithium ion battery.

* * * * *